Nov. 15, 1938.      R. E. WOOLLEY      2,136,900
MEASURING APPARATUS
Filed May 31, 1934      2 Sheets-Sheet 1

INVENTOR
Rew E. Woolley
BY
Raymond D. Junkins
ATTORNEY

Patented Nov. 15, 1938

2,136,900

UNITED STATES PATENT OFFICE 2,136,900

MEASURING APPARATUS

Rew E. Woolley, Shaker Heights, Ohio, assignor to Bailey Meter Company, a corporation of Delaware Application May 31, 1934, Serial No. 728,352

9 Claims. (Cl. 177—351)

This invention relates to apparatus for measuring the value of variable quantities, qualities or conditions, and particularly for automatically compensating for changes in condition or quality of a quantity which is to be measured. The quantity to be measured may desirably be a fluid rate of flow and the variable condition or quality of the fluid flow may, for example, be density, pressure, temperature, heat content or other condition or quality under which the flow is measured, or upon which measurement of the flow depends, or to which it is to be referred.

Fluid flow meters are usually calibrated to be read in terms of weight as, for example, pounds per hour, at predetermined density conditions of temperature and pressure. Such meters may be of a type wherein a differential pressure bearing a known relation to the rate of flow is produced by the flow through a constriction in the conduit such as an orifice, flow nozzle, or a Venturi tube. The actual weight of the fluid flowing through the restriction is not only a function of the difference in pressure at opposite sides of the restriction, but for any given value of pressure differential varies with the density of the fluid.

A primary object of my invention is to provide a new and novel rate of flow meter, particularly adapted for remote indication or totalizing.

A further object is to provide a simplified compensator for a rate of flow meter to automatically and continuously compensate for variations in density of the flowing fluid.

Still another object is to provide means for continuously taking into account in the measurement of a variable, the variations in conditions or deviations from predetermined condition upon which the measurement is based or to which the measurement is to be referred.

A further object is to continuously provide a measurement such as, for example, B. t. u. which is dependent not only upon the rate of supply of a quantity but also upon one or more variable qualities or conditions of the quantity.

Further objects will become apparent from a study of the drawings and specification to follow, as well as the claims appended hereto which are not to be limited by the specific embodiments illustrated and described.

Figure 1:
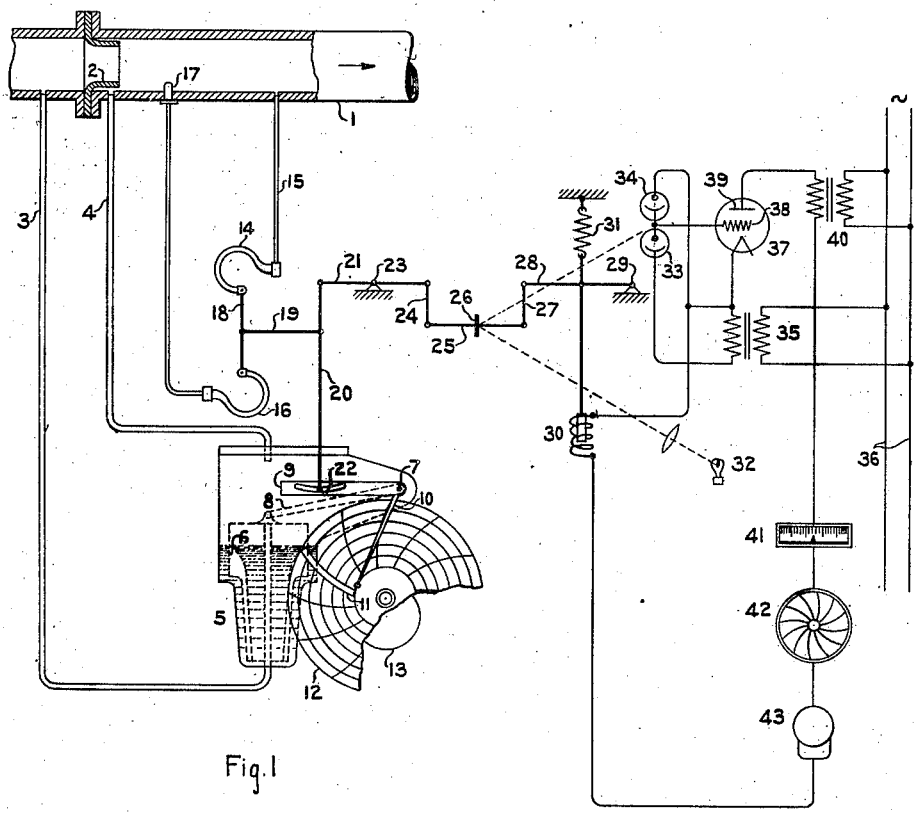
Fig. 1 represents somewhat diagrammatically a fluid flow meter having an indicator, recorder and integrator continuously compensated for variations in pressure and temperature of the fluid.

Referring first to Fig. 1, a variable such as the rate of flow of a fluid through a conduit 1 is desirably measured to continuously indicate and record the rate of flow and integrate with respect to time to give a total quantity of the fluid passing a given point during a specified interval of time, such as the interval between two readings of the integrator register. I show positioned within the conduit 1, a flow nozzle 2 forming a restriction to flow through the conduit and for creating thereby a pressure differential across the flow nozzle bearing a known relation to the rate of fluid flow therethrough. From the conduit 1 at opposite sides of the flow nozzle 2, I lead the pressure pipes 3 and 4 to a rate of flow meter indicated in general at 5.

Such a rate of flow meter may be of the liquid sealed bell type as disclosed in the patent to Ledoux 1,064,748 wherein the bell is shaped and has walls of material thickness, to the end that the positioning of the bell is in direct proportion to the rate of fluid flow, thereby correcting for the quadratic relation which exists between rate of fluid flow through such a flow nozzle and differential pressure resulting therefrom. The bell is shown at 6 diagrammatically in dotted line and may be sealed by a liquid such as mercury whose approximate level within and without the bell is indicated.

Pressure within the conduit 1 ahead of the flow nozzle 2 is effective through the pipe 3 upon the interior of the bell 6, while pressure at the outlet of the flow nozzle 2 is effective through the pipe 4 upon the exterior of the bell 6, to the end that the bell is positioned vertically by the pressure differential across the flow nozzle, and in linear relation to the rate of flow of the fluid.

Such a vertical positioning of the bell results in angular positioning, about a fixed fulcrum point 7, of an arm 8 for transmitting motion from the bell to the shaft of the fulcrum 7, for positioning an arm 9 whose function will be explained hereinafter, and for positioning an indicating pen and pointer 10 cooperating with an index 11. The pen 10 is further adapted to record over a circular recording chart 12 which is desirably driven uniformly at a constant speed by a clock motor 13.

At zero rate of flow as indicated, the arm 9 is substantially horizontal and the pen 10 indicates zero rate of flow relative to the index 11 and chart 12. As fluid commences to flow through the conduit and the rate of flow increases toward a maximum, the bell 6 rises due to the differential pressure applied thereto, and causes a clockwise rotation of the arms 8 and 9 about the pivot 7. Such a rate of flow meter is usually designed to read in weight equivalent of volume at a density corresponding to certain temperature and pressure, or other conditions. If steam is flowing through the conduit 1 in the direction of the arrow, then the meter 5 will indicate relative to the index 11 and record on the chart 12 the rate of fluid flow through the conduit in desirable units, for example, pounds per hour. However, such indication is correct only when predetermined conditions of pressure and temperature of the steam exist in the conduit 1. If the temperature and pressure of the steam deviates from the design values, then the readings on the index and chart should be corrected according to the deviation. It will be appreciated that steam at a greater pressure than a predetermined value will be of a greater density and at a greater temperature than the predetermined value will be of a lesser density.

I illustrate diagrammatically an arrangement whereby an indication of fluid rate of flow by the meter 5 is automatically and continuously compensated, for deviations from predetermined value of both pressure and temperature of the steam within the conduit 1. At 14, I indicate a Bourdon tube connected by the pipe 15 to the conduit 1 and responsive to static pressure of the steam. At 16, I indicate a similar Bourdon tube forming a part of a temperature sensitive system, of which 17 is the bulb positioned within the conduit 1 sensitive to the temperature of the steam.

Pivotally connected to the movable ends of the Bourbon tubes 14, 16 is a link 18, and to a point intermediate the ends of the link 18 is pivotally connected one end of a floating beam 19, the other end of which is pivoted intermediate the ends of a link 20. The lower end of the link 20 carries a roller or pin adapted to be moved in a slot 22 of the arm 9. The upper end of the link 20 is pivotally joined to a beam 21 which in turn is pivoted intermediate its ends at a fixed pivot 23.

The arrangement is such that when the fluid rate of flow is at zero, and pressure and temperature are of predetermined value, as shown in Fig. 1, then the arm 9 is substantially horizontal, and the link 20 substantially vertical. If the rate of flow increases from zero, the link 20 is moved substantially vertically upward, positioning the beam 21 in a clockwise direction around its pivot 23. A variation from predetermined value of either the temperature or pressure of the steam will cause a positioning of the beam 19 to the right or to the left on the drawings, with a corresponding movement of the link 20 wherein its lowermost end swings along the slot 22, with its uppermost end pivoted to the beam 21. This action is equivalent to varying the moment arm of the arm 9 between its connection to the link 20 and its pivot point 7.

As illustrated, if pressure of the steam increases, or temperature of the steam decreases, in either event denoting an increase in density of the steam, the beam 19 will be moved toward the left, thus lengthening the moment arm of the arm 9, and thus increasing the vertical movement of the link 20 for any given change in rate of fluid flow, whereby the rate of fluid flow, in terms of pounds, is multiplied by a correction factor greater than unity.

Angular positioning of the beam 21 about its pivot 23 results in vertical motion of a pivoted link 24, to the lower end of which is suspended one end of a floating beam 25 carrying a mirror 26. The other end of the beam 25 is pivotally connected to a link 27 which is freely suspended from a beam 28 pivoted at its other end to a fixed pivot 29. The beam 28 is held in any given position by the opposing forces of a solenoid 30 and a spring 31.

It will be seen that angular positioning of the mirror 26 is accomplished by variations in fluid rate of flow, steam pressure, and/or steam temperature. However, if the fluid rate of flow is at zero, then steam pressure and steam temperature may vary in any amount without affecting a movement of the miror 26, for the link 20 is merely swung about its pivoted connection with the beam 21, along the slot 22, without causing angular motion of the beam 21. If, however, the fluid rate of flow is at any point above zero, then the arm 9 being at an inclination to the horizontal, positions the slot 22 so that deviation of temperature and/or pressure from design value and corresponding movement of the link 20 will cause a vertical movement of the link as it travels up or down the arcuate slot 22 and coresponding angular positioning of the beam 21 around its pivot 23.

At 32 I indicate a light source directed upon the mirror 26, from which it is reflected on the photo cells 33, 34. Transformer 35 supplies voltage to the photo cells from a power source 36. Electron discharge device 37, having a grid 38 and plate 39, is shown with the grid 38 connected intermediate the photo cells 33, 34. The plate circuit of the electron discharge device 37 includes the winding of solenoid 30, the secondary of transformer 40, an indicator 41, a recorder 42 and an integrator 43.

The electron discharge device is a regulating tube under grid control, wherein the proportionality of light falling upon the potato cells 33, 34 varies the grid voltage to control the passage of current in the plate circuit above a minimum which may be zero. When the system is in a balanced condition, the mirror 26 throws light in a predetermined substantially equally distributed amount upon the two photo cells 33, 34, and the instruments 41, 42 and 43 are adjusted to indicate proper value in terms of fluid rate of flow.

The indicator 41 and recorder 42 are arranged to indicate and record fluid rate of flow corrected for temperature and pressure to design or predetermined values. The integrator 43 is adapted to give a continuous integration of fluid rate of flow relative to time in terms of predetermined density conditions of the fluid. It is, of course, apparent that these instruments may be calibrated in terms of B. t. u. or otherwise as desired. These instruments are in series with each other in the plate circuit and are of the ampere hour type and may be of a type substantially independent of voltage variations. However, to avoid complicating the wiring diagram, I have indicated them only diagrammatically and have not felt it necessary to illustrate the internal structure or connections, as such instruments are well known in the art.

The operation is as follows: Asuming that the fluid rate of flow is at zero value, then all variations in temperature and pressure of the fluid will have no effect upon the position of the mirror 26 and will cause thereby no unbalance of the electrical circuit. The indicator 41 and recorder 42 will read at zero, and the integrator 43 will not be rotating. The pen 10 of the flow meter 5 will read at zero relative to the index 11 and recording chart 12.

If now, the fluid rate of flow increases to some value above zero, and the temperature and pressure of the fluid remain at predetermined value, then the mirror 26 will be moved in a counter-clockwise direction around the joining pivot of the parts 25, 27, deflecting the light from the source 32 to a greater extent upon the photo cell 34 than upon the photo cell 33. This causes an unbalance whereby the grid voltage of the electron discharge device 37 varies the passage of current through the plate circuit in an increasing direction, and such increase in current in the plate circuit results in a movement of the indicator 41 and recorder 42 to values representative of the fluid rate of flow, and the integrator 43 rotates at a speed dependent upon the fluid rate of flow. At the same time, this current flow through the solenoid 30 produces an increased pull whereby the beam 28 is rotated in a counterclockwise direction around its pivot 29 and opposed by the spring 31, until the mirror 26 is positioned to substantially its previous position and the balance of light between the photo cells 33, 34 is restored. When such balanced condition is reached, the indicator 41 and recorder 42 indicate the value of the fluid rate of flow, and readings of the integrator 43 between definite intervals of time will give the integration of the fluid rate of flow relative to time.

If for any fluid rate of flow above zero the pressure and/or temperature of steam deviate from design values, then a compensation is effected as a movement of the mirror 26, in effect multiplying the flow readings by a value above or below unity, dependent upon the amount of correction necessary for the density change.

It will be observed that the index 11 and recording chart 12 are to be read in values of fluid rate of flow uncorrected for temperature and/or pressure deviations from design value, whereas the indicator 41, the recorder 42 and the integrator 43 are to be read in terms of fluid rate of flow corrected for changes in temperature and/or pressure from design value, and may be calibrated to read in terms of B. t. u. or otherwise as desired.

Figure 2:
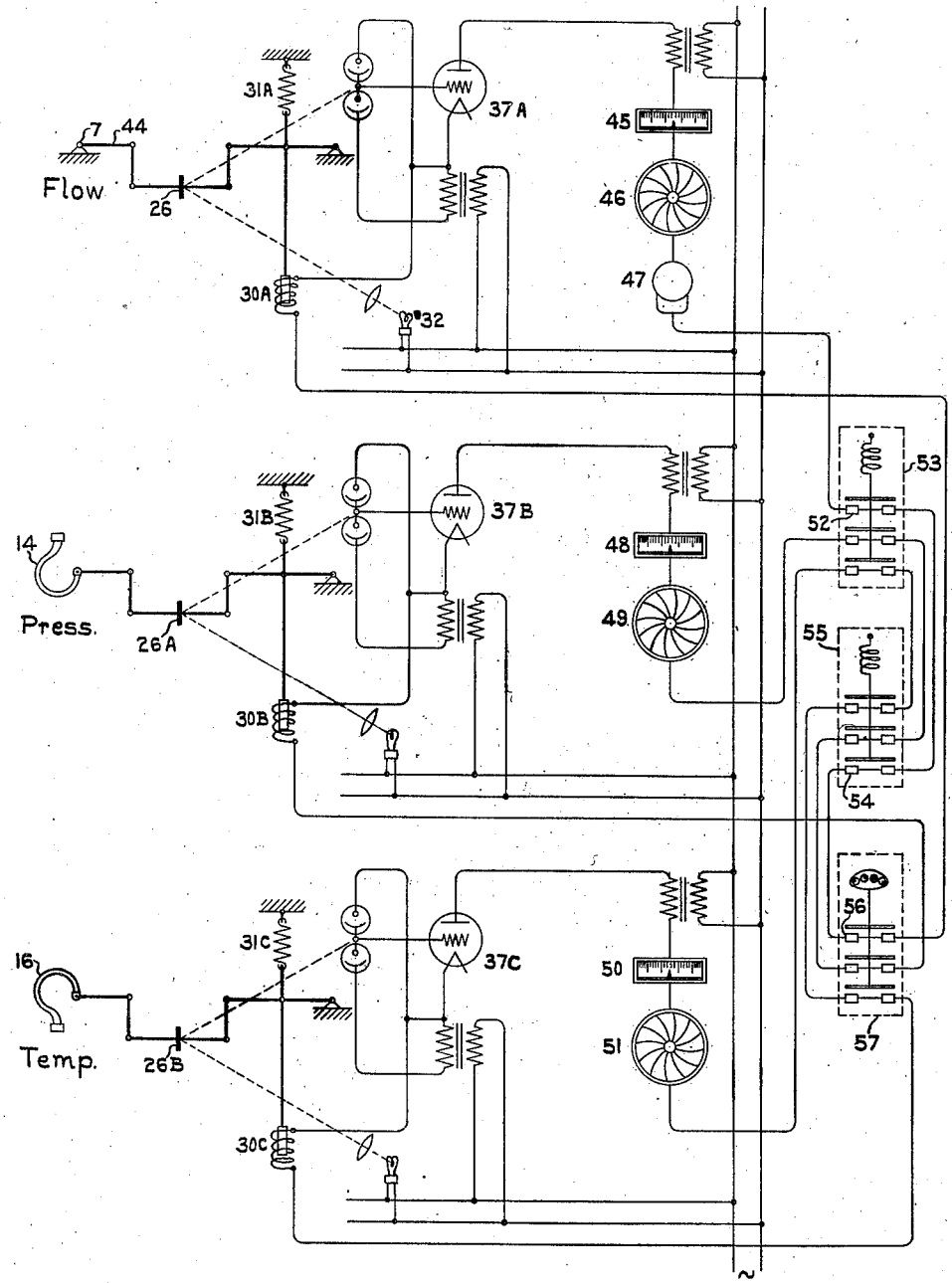
Fig. 2 is a diagrammatic representation of a flow meter wherein the quantity measurement is continuously compensated for variations in value of pressure and temperature.

In Fig. 2 I illustrate a further embodiment of my invention wherein the compensation of flow for pressure and temperature deviations is accomplished electrically rather than mechanically as in Fig. 1. In Fig. 1, I apply to the linkage a compensation dependent upon the position of the Bourdon tubes 14, 16, representative of pressure and temperature respectively. In Fig. 2 I show three similar electrical circuits, one controlled according to fluid rate of flow, a second according to fluid pressure, and a third according to fluid temperature. The three circuits are similar and are similar to the one illustrated in Fig. 1.

I have not felt it necessary in this illustration to show the complete flow meter nor the fluid conduit and connections to the pressure and temperature Bourdon tubes. It is sufficient to say that they are similar to the illustration of Fig. 1. The beam 44 corresponds to the arm 9 and is adapted to be positioned around the pivot 7 in a clockwise direction for an increase in rate of flow. The resulting movement of the mirror 26 is as described for Fig. 1. Herein, however, the indicator 45, the recorder 46 and the integrator 47 are adapted to read in terms of fluid rate of flow uncorrected for deviations in temperature and/or pressure.

The Bourdon tube 14, responsive to pressure, is adapted to position the mirror 26A and control the grid voltage of the electron discharge device 37B, as previously explained. The indicator 48 and recorder 49 read in terms of steam pressure.

The Bourdon tube 16, positioned responsive to steam temperature, is adapted to position the mirror 26B for control of the grid voltage of the electron discharge device 37C. The indicator 50 and recorder 51 are adapted to read in terms of steam temperature.

It will be observed that the plate circuit of the device 37A, after leaving the integrator 47, is carried through a pair of coils 52 of an indicator 53, then in series through a pair of coils 54 of a recorder 55, and in series through a pair of coils 56 of an integrator 57, before joining the solenoid winding 30A. Likewise, the plate circuit of the device 37B is led in series from the recorder 49 through the indicator 53, the recorder 55, and the integrator 57. Likewise, the plate circuit of the device 37C, after leaving the recorder 51, is led in series through the indicator 53, the recorder 55, and the integrator 57.

The indicator 53, the recorder 55, and the integrator 57 are multi-circuit instruments of the balanced relay type, such as a polyphase watt hour meter wherein the multi-windings algebraically add up. The indicator and recorder are designed with springs to oppose tendency to rotation of the discs where such rotation is urged by the coils 52, 54, etc. The resulting angular positioning of the discs and the shafts on which they are carried causes the positioning of a pointer in the case of the indicator 53 and of the recording pen in the case of the recorder 55, for indicating and recording the rate of steam flow corrected for temperature and pressure deviations from design value. Correspondingly, the integrator 57, which has a register and whose shaft rotates at a speed determined by the relative values of the current flowing through its coils, is adapted to continuously integrate the fluid rate of flow in terms of design pressure and temperature or in terms of B. t. u.

It will be observed, then, that the indicator 45, the recorder 46, and the integrator 47 read in terms of fluid rate of flow uncorrected for temperature and pressure deviations. The indicator 48 and the recorder 49 read in terms of steam pressure. The indicator 50 and recorder 51 read in terms of steam temperature. The indicator 53, recorder 55, and integrator 57 read in terms of steam flow corrected for temperature and pressure deviations from design value, or these latter instruments may be calibrated to read in terms of B. t. u. or otherwise as desired.

It will be noted that any of the indicating, recording, or integrating instruments referred to may be located adjacent to the meters, or remote thereto, or to each other.

It is, of course, to be understood that the fluid flowing through the conduit I need not be steam or water but may be any fluid. That the variable conditions or qualities need not be temperature or pressure, and in fact, that the quantity to be compensated need not be a fluid rate of flow. While I have illustrated and described certain preferred embodiments of my invention, it is to be understood that I am to be limited only by the claims in view of prior art.

What I claim as new, and desire to secure by Letters Patent of the United States, is:—

1. In combination, an electron discharge device having an input and an output circuit, a movable member, means for positioning one end of said member solely in accordance with the magnitude of a variable, means for positioning the other end of said member solely in accordance with the current in the output circuit of said device, a photo-electric device for electrically controlling said input circuit, means carried by said member for controlling light on said photo-electric device in accordance with the position of said member, and exhibiting means of the current in said output circuit.

2. Apparatus for continuously measuring a quantity in terms of standard conditions comprising in combination, means responsive to the magnitude of the quantity, means separately responsive to departure of the conditions each from a standard, a first member jointly positioned by all of said means, a movable member, one end of said movable member operatively connected to said first member, an electron discharge device having a grid, a cathode, and an anode, means for positioning the opposite end of said movable member in accordance with the current in the cathode-anode circuit of said device, a pair of photo-electric cells oppositely arranged in series for electrically controlling the grid potential of said electron discharge device, means positioned by said movable member for differentially controlling the light directed on said photo cells, whereby a change in position of said movable member by said condition and/or quantity responsive means in given direction produces a change in current in a predetermined sense in said anode-cathode circuit, positioning the opposite end of said movable member in a direction to produce a change in current in opposite sense; and exhibiting means sensitive to the current in said cathode-anode circuit.

3. Apparatus for continuously measuring a quantity in terms of standard conditions comprising in combination, means responsive to the magnitude of the quantity, means separately responsive to departure of the conditions each from a standard, a first member jointly positioned by all of said means, a movable member, one end of said movable member operatively connected to said first member, an electron discharge device having a grid, a cathode and an anode, means for positioning the opposite end of said movable member in accordance with the current in the cathode-anode circuit of said device, a pair of photo-electric cells oppositely arranged in series for electrically controlling the grid potential of said electron discharge device, means angularly positioned by said movable member for differentially controlling the light directed on said photo cells and exhibiting means sensitive to the current in said cathode-anode circuit.

4. In apparatus for continuously measuring a variable, in combination, a member angularly positioned from an initial position in accordance with the sense and magnitude of a change in said variable, an electron discharge device having a grid, cathode and anode, a pair of photo-electric cells oppositely arranged in series for electrically controlling the grid potential of said device, means for differentially controlling the light directed on said photo cells in accordance with the angular position of said member, means for partially restoring said member to the initial position upon departure therefrom comprising electro-magnetic means responsive to the current in the anode-cathode circuit; and means actuated by said electro-magnetic means for angularly positioning said member.

5. Apparatus for continuously measuring a variable comprising in combination, means responsive to the magnitude of the variable, a first member positioned by said means, a movable member, one end of said movable member operatively connected to said first member, an electron discharge device having a grid, a cathode, and an anode, means for positioning the opposite end of said movable member in accordance with the current in the cathode-anode circuit of said device, a pair of photoelectric cells oppositely arranged in series for electrically controlling the grid potential of said electron discharge device, means positioned by said movable member for differentially controlling the light directed on said photo cells, whereby a change in position of said movable member by said variable responsive means in given direction produces a change in current in a predetermined sense in said anode-cathode circuit, positioning the opposite end of said movable member in a direction to produce a change in current in opposite sense; and exhibiting means sensitive to the current in said cathode-anode circuit.

6. Apparatus for continuously measuring the magnitude of a variable comprising in combination, a movable member, means for positioning one end of said member in proportion to changes in magnitude of the variable about the opposite end as a center of rotation, spring loaded electromagnetic means for positioning said opposite end of said member about the first end as a center of rotation in accordance with the current in said electromagnetic means, an electron discharge device having a grid, a cathode and an anode, said electromagnetic means connected in the anode-cathode circuit, measuring means of the current in said anode-cathode circuit, a pair of photoelectric cells, a connection between the anode of one photoelectric cell and the cathode of the other, a connection between said first connection and said grid whereby the grid potential is varied relative to the cathode potential in accordance with the difference in high frequency energy impressed upon said photo cells, a source of high frequency energy, reflecting means carried by said movable member intermediate its ends for controlling the relative intensity of high frequency energy on said photoelectric cells whereby changes in position of said movable member in one direction by said first named means effects a change in current in the output circuit of said electron discharge device causing a proportionate positioning of the opposite end of said member in opposite direction.

7. Apparatus for continuously measuring a variable, comprising in combination, a differential member, a point on said member positioned solely in accordance with changes in the value of the variable, electromagnetic means, a second point on said member positioned solely by said electromagnetic means, an electron discharge device, means under the control of said member for establishing a current in the output circuit of said device proportional to the position of said member, exhibiting means of the value of the variable; said exhibiting means and electromagnetic means in series in the output circuit of said device.

8. Apparatus for continuously measuring a variable comprising in combination, an electron discharge device having an input and an output circuit, a differential member, a point on said member positioned solely in accordance with changes in the value of the variable, means sensitive to the current in the output circuit of said electron discharge device, a second point on said member positioned solely by said last named means, means under the control of said member for establishing an input circuit potential proportional to the position of said member, and exhibiting means sensitive to the current in said output circuit.

9. In an apparatus for continuously measuring a variable in terms of standard conditions, in combination, means separately responsive to departure of the conditions each from a standard and to the variable, means including a member having a point positioned solely by said last named means, an electron discharge device having an input and an output circuit, electromagnetic means responsive to the current in the output circuit, a second point on said member positioned solely by said electromagnetic means, means under the control of said member for regulating the input circuit of said device and exhibiting means sensitive to the current in the output circuit of said device.

REW E. WOOLLEY.